(12) United States Patent
Iwabuchi

(10) Patent No.: US 8,789,567 B2
(45) Date of Patent: Jul. 29, 2014

(54) PNEUMATIC TIRE

(75) Inventor: Sotaro Iwabuchi, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 403 days.

(21) Appl. No.: 12/677,679

(22) PCT Filed: Sep. 9, 2008

(86) PCT No.: PCT/JP2008/066207
§ 371 (c)(1),
(2), (4) Date: May 6, 2010

(87) PCT Pub. No.: WO2009/034959
PCT Pub. Date: Mar. 19, 2009

(65) Prior Publication Data
US 2010/0212796 A1 Aug. 26, 2010

(30) Foreign Application Priority Data

Sep. 12, 2007 (JP) ................................. 2007-236329

(51) Int. Cl.
*B60C 11/04* (2006.01)
(52) U.S. Cl.
USPC .................................. 152/209.18; 152/209.8
(58) Field of Classification Search
USPC ............... 152/209.8, 209.15, 209.18, 209.28;
D12/515–532, 557–567, 592–603
See application file for complete search history.

(56) References Cited

U.S. PATENT DOCUMENTS 4,178,199 A * 12/1979 Lippman et al. ............ 29/894.37
5,417,268 A * 5/1995 Kishi ........................ 152/209.18
(Continued)

FOREIGN PATENT DOCUMENTS

JP 06-008711 * 1/1994
JP 6-40215 A 2/1994
(Continued)

OTHER PUBLICATIONS

English machine translation of Fujita (JP2007-12218), 05-20007.*

(Continued)

*Primary Examiner* — Steven D Maki
*Assistant Examiner* — Robert Dye
(74) *Attorney, Agent, or Firm* — Sughrue Mion, PLLC

(57) ABSTRACT

A pneumatic tire (1) having a sound absorption effect by lateral grooves is provided. The tire tread (2) has circumferential grooves formed continuously in the circumferential direction and lateral grooves extending from a circumferential groove. One end of each lateral groove is connected to the circumferential groove and the other end is a dead end. Each of the lateral grooves (7) includes a one-directional groove (11) extending in one direction from the circumferential groove (5) toward a side edge of the tire and an another-directional groove (14) extending in another direction from the circumferential groove toward the side edge of the tire. A root section (11a), which is close to the circumferential groove, of the one-directional groove (11) and a root section (14a), which is close to the circumferential groove (5), of the another-directional groove (14) are formed by a common groove (15). And a leading part (1b) of the one-directional groove (11) and a leading part (14b) of the another-directional groove (14) are branching away from each other from a leading end of the common groove (15).

10 Claims, 9 Drawing Sheets

(56) References Cited

U.S. PATENT DOCUMENTS

| | | | |
|---|---|---|---|
| 5,526,860 A * | 6/1996 | Minami | 152/209.18 |
| 5,688,342 A * | 11/1997 | Sugihara | 152/209.9 |
| 6,129,127 A | 10/2000 | Nicotina | |
| D458,583 S * | 6/2002 | Villamizar | D12/590 |
| 6,474,381 B1 * | 11/2002 | Tsuda | 152/209.24 |
| D574,765 S * | 8/2008 | Smith | D12/547 |
| 2002/0026972 A1 | 3/2002 | Ochi | |
| 2006/0042738 A1 | 3/2006 | Matsumoto | |
| 2007/0051448 A1 * | 3/2007 | Yumii | 152/209.18 |
| 2007/0131324 A1 | 6/2007 | Fujita | |

FOREIGN PATENT DOCUMENTS

| | | |
|---|---|---|
| JP | 7-215013 A | 8/1995 |
| JP | 8-34208 A | 2/1996 |
| JP | 10-157416 A | 6/1998 |
| JP | 2002-29224 A | 1/2002 |
| JP | 2004-17863 A | 1/2004 |
| JP | 2005-22530 A | 1/2005 |
| JP | 2006-69305 A | 3/2006 |
| JP | 2007-112218 A | 5/2007 |
| JP | 2007-161057 A | 6/2007 |
| JP | 2007-161114 A | 6/2007 |
| JP | 2007-182147 A | 7/2007 |

OTHER PUBLICATIONS

English machine translation of JP06-008711, dated Jan. 1994.*

* cited by examiner

FIG.8
(a) FOURTH EMBODIMENT

| NAME | WIDTH (mm) | GROOVE ANGLE (°) | GROOVE DEPTH (mm) |
|---|---|---|---|
| ① CIRCUMFERENTIAL GROOVE 3 | 5.5 | 5 | 8 |
| ② CIRCUMFERENTIAL GROOVE 4 | 11 | 10 | 8 |
| ③ CIRCUMFERENTIAL GROOVE 5 | 8 | 15 | 8 |
| ④ CIRCUMFERENTIAL GROOVE 6 | 7.5 | 5 | 8 |
| ⑤ LATERAL GROOVE (ONE-DIRECTIONAL GROOVE 11 + TURNED-BACK GROOVE 13) | 4 (AVERAGE VALUE) | 0 | 6 |
| ⑥ LATERAL GROOVE (ANOTHER-DIRECTIONAL GROOVE 14) | 4 (AVERAGE VALUE) | 0 | 6 |

FIG.8
(b) COMPARATIVE EXAMPLE

| NAME | WIDTH (mm) | GROOVE ANGLE (°) | GROOVE DEPTH (mm) |
|---|---|---|---|
| ① CIRCUMFERENTIAL GROOVE 3 | 5.5 | 5 | 8 |
| ② CIRCUMFERENTIAL GROOVE 4 | 11 | 10 | 8 |
| ③ CIRCUMFERENTIAL GROOVE 5 | 8 | 15 | 8 |
| ④ CIRCUMFERENTIAL GROOVE 6 | 7.5 | 5 | 8 |
| ⑤ LATERAL GROOVE 70 | 4 (AVERAGE VALUE) | 0 | 6 |
| ⑥ LATERAL GROOVE 71 | 3 (AVERAGE VALUE) | 0 | 6 |

FIG. 9

|  | COMPARATIVE EXAMPLE | FOURTH EMBODIMENT |
|---|---|---|
| DRY STEERING STABILITY | 100 | 110 |
| NOISE CONTROL EFFECT | 100 | 120 |
| STONE RETENTION PREVENTING EFFECT | 100 | 120 |

PNEUMATIC TIRE

CROSS REFERENCE TO RELATED APPLICATIONS

This application is a National Stage of International Application No. PCT/JP2008/066207 filed Sep. 9, 2008, claiming priority based on Japanese Patent Application No. 2007-236329, filed Sep. 12, 2007, the contents of all of which are incorporated herein by reference in their entirety.

TECHNICAL FIELD

The present invention relates to a groove structure formed in the tire tread of a pneumatic tire.

BACKGROUND ART

There is known a pneumatic tire with the tire tread having circumferential grooves formed continuously around the circumference thereof and lateral grooves extending from a circumferential groove such that one end of each lateral groove is connected to the circumferential groove and the other end thereof is a dead end (see Reference 1, for instance). These lateral grooves each have a one-directional groove extending in one direction from the circumferential groove toward a side edge of the tire and double-winged grooves extending from the leading end of the one-directional grove in both one and the other circumferential directions of the tire tread.

Reference 1: Japanese Unexamined Patent Application Publication No. 2006-69305

DISCLOSURE OF THE INVENTION

Problems to be Solved by the Invention

When the lateral grooves are so constructed as to have double-winged grooves as in the above-cited known art, the length of the groove for absorbing sound is the distance to the end of the longer of the double-winged grooves. The shorter of the double-winged grooves, which is subordinate to the other, plays the role of gaining volume only. Hence, there results a problem of less than enough total groove length.

The present invention has been made in view of the drawbacks of the conventional art as described above, and an object thereof is to provide a pneumatic tire that can improve the sound absorption effect by the lateral grooves.

Means for Solving the Problem

A pneumatic tire according to the present invention has a tire tread which has circumferential grooves formed continuously in the circumferential direction thereof and lateral grooves extending from a circumferential groove such that one end of each lateral groove is connected to the circumferential groove and the other end thereof is a dead end. Each of the lateral grooves includes a one-directional groove extending in one direction from the circumferential groove toward a side edge of the tire and an another-directional groove extending in another direction from the circumferential groove toward the side edge of the tire. A root section, which is close to the circumferential groove, of the one-directional groove and a root section, which is close to the circumferential groove, of the another-directional groove are formed by a common groove. And a leading part of the one-directional groove and a leading part of the another-directional groove are branching away from each other from a leading end of the common groove. Therefore, the sound absorption effect to be derived from the total length of the one-directional groove can be augmented by the groove volume of the another-directional groove. This improves the sound absorption effect by the lateral grooves.

Another pneumatic tire according to the present invention has a tire tread which has circumferential grooves formed continuously in the circumferential direction thereof and lateral grooves extending from a circumferential groove such that one end of each lateral groove is connected to the circumferential groove and the other end thereof is a dead end. Each of the lateral grooves includes a one-directional groove extending in one direction from the circumferential groove toward a side edge of the tire, a turned-back groove extending from a leading end of the one-directional groove toward the circumferential groove, and an another-directional groove extending in another direction from the circumferential groove toward the side edge of the tire. A root section, which is close to the circumferential groove, of the one-directional groove and a root section, which is close to the circumferential groove, of the another-directional groove are formed by a common groove. And a leading part of the one-directional groove and a leading part of the another-directional groove are branching away from each other from a leading end of the common groove. Therefore, the turned-back groove ensures a longer length for the one-directional groove within a limited space, thus improving the sound absorption effect by the lateral grooves.

Also, the extended length of each of the lateral grooves is 1.0 cm or more and 20 cm or less. Therefore, in the lateral grooves which absorb sounds of different frequencies according to the groove length, an advantageous effect of absorbing sounds of wider frequency range can be achieved.

Also, the one-directional groove is so formed as to extend in one direction from the circumferential groove toward the one side edge of the tire and in one circumferential direction, and a turned-back groove is so formed as to extend from the leading end of the one-directional groove toward the other side edge of the tire and in the other circumferential direction of the tire. Therefore, when a plurality of lateral grooves are to be provided in the circumferential direction, the respective end portions of circumferentially adjacent lateral grooves can be positioned on a plane that intersects the equatorial plane of the tire at right angles. Thus, a larger number of lateral grooves can be provided circumferentially in the tire tread, and the larger number of lateral grooves improves the sound absorption effect thereof.

Also, the angle formed between the turned-back groove and the one-directional groove is 20 degrees or more and 45 degrees or less. Therefore, a larger number of lateral grooves can be provided circumferentially in the tire tread.

Also, the one-directional groove and the another-directional groove are formed such that their extended lengths differ from each other. Therefore, the groove of longer extended length absorbs sounds of specific frequencies while the groove of shorter extended length improves the sound absorption by the groove of longer extended length.

Also, the one-directional groove and the another-directional groove are both formed such that they extend in the one circumferential direction of the tire tread, and the acute angle of the groove of longer extended length with respect to the circumferential groove is smaller than that of the groove of shorter extended length. Therefore, the groove of longer extended length, which has a stronger tendency to extend in a circumferential direction, improves the sound absorption effect, whereas the groove of shorter extended length, which has a stronger tendency to extend toward the one side edge, improves the edge effect of the tire.

Also, the another-directional groove and the turned-back groove are formed in parallel with each other. Therefore, an equal edge effect can be achieved whether the tire is rotated in one circumferential direction or in the other circumferential direction.

Also, a plurality of lateral grooves are arranged side by side in the circumferential direction of the tire tread, and the respective end portions of circumferentially adjacent lateral grooves are positioned on a plane intersecting the equatorial plane of the tire at right angles. Therefore, a larger number of lateral grooves can be provided circumferentially in the tire tread, and the larger number of lateral grooves improves the sound absorption effect thereof.

Also, at least a part of the groove walls of the lateral groove is formed as an inclined surface whose angle with the tire tread is an obtuse angle. Therefore, there will be reduced chances of stone retention in the lateral grooves. Even when a stone is retained in a lateral groove, the inclined surface makes it easier for the stone to extricate itself from the lateral groove. This enhances the stone retention preventing effect and achieves the noise restricting effect accordingly.

Also, the lateral grooves are formed in a position dislocated toward a side edge of the tire from a position on the equatorial plane of the tire, and the side on which the lateral grooves are formed is disposed in a position closer to a lateral side of a vehicle. Therefore, the tire will display excellent steering stability and quieter running.

BRIEF DESCRIPTION OF THE DRAWINGS

FIG. 8 is tables of dimensional data on the tire of the fourth embodiment and the tire of the comparative example used in a performance comparison.

FIG. 9 is a table showing the results of performance comparison between the tire of the fourth embodiment and the tire of the comparative example.

Figure 1:
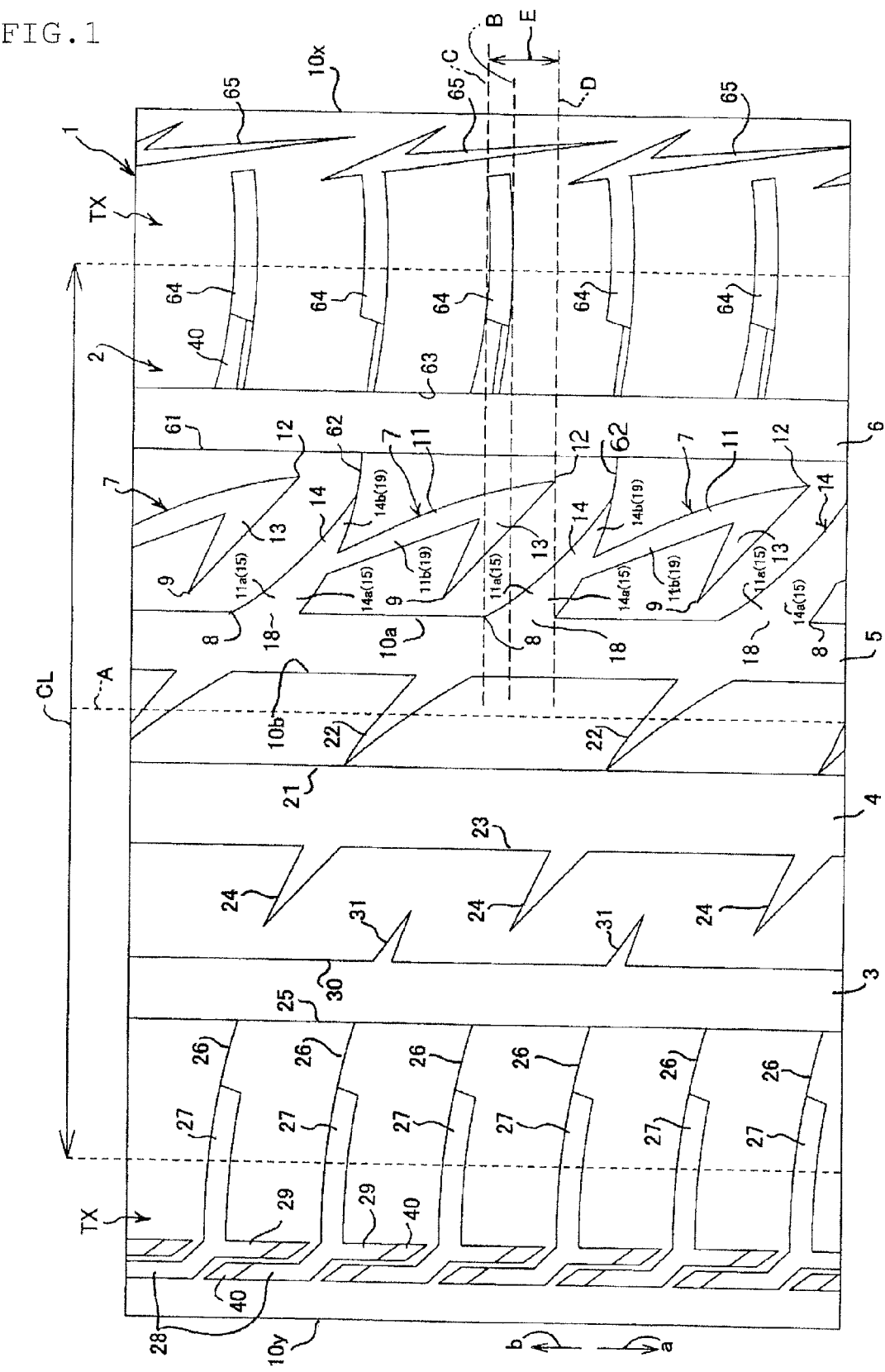
FIG. 1 is an illustration of a groove configuration on the tire tread (first embodiment).

| REFERENCE NUMERALS | |
|---|---|
| 1 | tire |
| 2 | tire tread |
| 3, 4, 5, 6 | circumferential groove |
| 7 | lateral groove |
| 7a | groove wall |
| 8 | one end |
| 9 | the other end |
| 10x | one side edge (side edge) |
| 10y | other side edge |
| 11 | one-directional groove |
| 11a | root section |
| 11b | leading part |
| 12 | leading end |
| 13 | turned-back groove |
| 14 | another-directional groove |
| 14a | root section |
| 14b | leading part |
| 15 | common groove |
| 19 | branching groove |
| A | equatorial plane of tire |
| B | plane intersecting the equatorial plane of tire at right angles |

BEST MODE FOR CARRYING OUT THE INVENTION

First Embodiment

Best Mode 1

Figure 5:
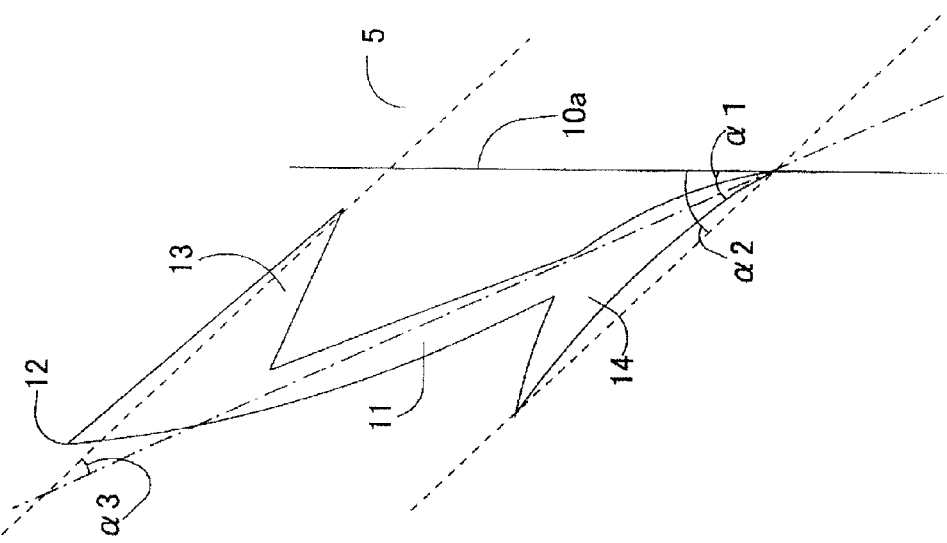
FIG. 5 is an illustration showing a relationship between a turned-back groove and an another-directional groove of a lateral groove (first embodiment).

FIG. 1 and FIG. 5 illustrate a first embodiment of the present invention. FIG. 1 shows a groove configuration in a tire tread (tread pattern) of a pneumatic tire, and FIG. 5 shows a relationship between a turned-back groove and an another-directional groove of a lateral groove.

As shown in FIG. 1, the tire tread (tread) 2 of the pneumatic tire 1 (hereinafter referred to simply as "tire 1") has a plurality of circumferential grooves 3, 4, 5, and 6 and a plurality of lateral grooves 7. Each of the circumferential grooves 3, 4, 5, and 6 is formed continuously around the circumference of the tire tread 2. The plurality of lateral grooves 7 are so formed as to extend from a single circumferential groove 5 which is located closest to the equatorial plane A of the tire 1. The circumferential groove 5 is formed in a position dislocated toward one side edge 10x, which is one of the side edges of the tire 1, from the equatorial plane A of the tire 1. The lateral grooves 7 are each formed such that one end 8 thereof is connected to a groove wall 10a, which is a groove wall of the circumferential groove 5 closer to the one side edge 10x, and the other end 9 thereof is a dead end. The equatorial plane A of the tire 1 is the plane lying across the middle part between the one side edge 10x and the other side edge 10y of the tire 1 and the center line thereof. Note also that in FIG. 1 CL denotes the tire tread width and TX the shoulder region.

The lateral groove 7 includes a one-directional groove 11, which extends in one direction from a groove wall 10a of the circumferential groove 5, the groove wall 10a being closer to the one side edge 10x, toward the one side edge 10x of the tire 1 and in one circumferential direction a of the tire 1, a turned-back groove 13, which extends from a leading end 12 of the one-directional groove 11 toward the circumferential groove 5 and in the other circumferential direction b of the tire 1, and an another-directional groove 14, which extends in a direction different from the one direction of the one-directional groove 11, that is, in a direction from the circumferential groove 5 toward the one side edge 10x of the tire 1 and in the one circumferential direction a of the tire 1. A root section 11a, which is close to the circumferential groove 5, of the one-directional groove 11 and a root section 14a, which is close to the circumferential groove 5, of the another-directional groove 14 are formed by a common groove 15, and a leading part 11b of the one-directional groove 11 and a leading part 14b of the another-directional groove 14, which are branching away from each other at the leading end of the common groove 15, are formed by grooves 19. The leading end of the another-directional groove 14 and the other groove wall 61 of a circumferential groove 6 are connected to each other by a line-like groove 62, called a sipe, whose groove width is 0.1 to 0.5 mm.

A plurality of lateral grooves 7 are arranged side by side in the circumferential direction of the tire tread 2, with the respective end portions of circumferentially adjacent lateral grooves 7 positioned on a plane B that intersects the equatorial plane A of the tire 1 at right angles. In other words, the respective end portions of circumferentially adjacent lateral grooves 7 of the tire 1 are located within a lateral groove coexisting region E, which is between one plane C intersecting the equatorial plane A of the tire 1 at right angles and in contact with one end 8 (an end in the circumferential direction) of one of the circumferentially adjacent lateral grooves 7 and the other plane D intersecting the equatorial plane A of the tire 1 at right angles and in contact with the leading end 12 (the other end in the circumferential direction) of the other of the circumferentially adjacent lateral grooves 7. That is, the plurality of lateral grooves 7 are not provided circumferentially spaced apart from each other in the tire tread 2, but they are so configured that the respective end portions of two lateral grooves 7 coexist within the lateral groove coexisting region E between the one plane C and the other plane D. Also, it is so arranged that the length of the end portion of a lateral groove 7 positioned in the lateral groove coexisting region E is 10% or more and 50% or less of the circumferential length of the lateral groove 2. Since the arrangement is such as described above, more lateral grooves 7 can be provided circumferentially in the tire tread 2 than with a configuration in which a plurality of lateral grooves 7 are provided circumferentially spaced apart from each other in the tire tread 2. Thus, a larger number of lateral grooves 7, which can be provided circumferentially in the tire tread 2, improves the sound absorption effect by the lateral grooves 7. Moreover, there will be reduced variation in rigidity in the lateral groove coexisting region E. In effect, a vibration restricting effect will be derived on account of the reduced difference in rigidity in the lateral groove coexisting region E.

The one-directional groove 11 is formed longer in extended length than that of the another-directional groove 14. That is, the one-directional groove 11 and the another-directional groove 14 are formed with different extended lengths. The extended length of the one-directional groove 11 is 2 cm or more and 19 cm or less, that of the turned-back groove 13 is 1 cm or more and 10 cm or less, and that of the another-directional groove 14 is 1 cm or more and 10 cm or less. For example, if the extended length of the one-directional groove 11 is 10 cm, that of the turned-back groove 13, 3 cm, and that of the another-directional groove 14, 3 cm, then the one-directional groove 11 will provide a sound absorption effect while the turned-back groove 13 and the another-directional groove 14 will assume the role of augmenting the groove length and groove volume of the one-directional groove 11. Also, the turned-back groove 13 and the another-directional groove 14, which have each an edge effect, will provide a balanced advantageous effect of sound absorption and edge effect. If the extended length of the one-directional groove 11 is 10 cm and that of the turned-back groove 13, 5 cm, then the groove length that works for the sound absorption effect can be made longer, thereby presenting an effect of absorbing sounds of lower frequencies. And if the extended length of the one-directional groove 11 is 10 cm and that of the another-directional groove 14, 5 cm, then the volume of the groove working for the sound absorption effect can be increased, thereby enhancing the sound absorption effect of the one-directional groove 11.

As shown in FIG. 5, the relationship between the acute angle α1 formed between the groove wall 10a and the one-directional groove 11 and the acute angle α2 formed between the groove wall 10a and the another-directional groove 14 is: acute angle α1<acute angle α2. That is, the acute angle α1 of the one-directional groove 11 of longer extended length with respect to the groove wall 10a is formed as an acute angle that is smaller than the acute angle α2 of the another-directional groove 14 of shorter extended length with respect to the groove wall 10a. Also, the angle α3 between the one-directional groove 11 and the turned-back groove 13 is formed at 20 degrees or more and 45 degrees or less. Most preferably, however, the angle α3 should be formed at about 25 degrees.

The another-directional groove 14 and the turned-back groove 13 are formed such that their extension directions are approximately the same. In other words, the another-directional groove 14 and the turned-back groove 13 are formed approximately in parallel with each other. That is, the another-directional groove 14 and the turned-back groove 13 are formed in parallel with each other or nearly in parallel with each other.

The tire 1 constructed as described above is mounted on a not-shown vehicle in such a manner that the one side edge 10x thereof having the lateral grooves 7 formed therein is positioned to face a lateral vehicle side, and the other side edge 10y thereof to face the vehicle center.

It is to be noted that circumferential grooves 3 and 4 are formed in the tire tread 2 on the side of the equatorial plane A closer to the other side edge 10y. And circumferential grooves 5 and 6 are formed in the tire tread 2 on the side of the equatorial plane A closer to the one side edge 10x. The tire tread 2 also has one-directional grooves 22, each of which extends in one direction from the other groove wall 10b of the circumferential groove 5, the groove wall 10b being closer to the other side edge 10y, toward the other side edge 10y and in the other circumferential direction b and connects with the one groove wall 21 of the circumferential groove 4; one-directional grooves 24, each of which extends in one direction from the other groove wall 23 of the circumferential groove 4 toward the other side edge 10y and in the other circumferential direction b; line-like grooves 26, called sipes, each of which extends in one direction from the other groove wall 25 of the circumferential groove 3 toward the other side edge 10y; one-directional grooves 27, each of which extends in one direction from the leading end of the line-like groove 26 toward the other side edge 10y; one-directional grooves 31, each of which extends in one direction from the one groove wall 30 of the circumferential groove 3 toward the one side edge 10x and in the one circumferential direction a; and one-directional grooves 64, each of which extends in one direction from the one groove wall 63 of the circumferential groove 6 toward the one side edge 10x. In the shoulder region TX on the one side edge 10x side, every other one-directional groove 64 has a groove 65 which extends in the one circumferential direction a from the leading end thereof. In the shoulder region TX on the other side edge 10y side, each of the one-directional grooves 27 has branching grooves 28 and 29 which extend in the one circumferential direction a and in the other circumferential direction b, respectively, from the leading end thereof. The one-directional groove 11, the one-directional groove 22, the one-directional groove 24, the line-like groove 26, and the one-directional groove 27 are formed such that they are positioned on the same arc.

According to the first embodiment, the tire 1 has a tire tread 2 having lateral grooves 7, each of which consists of a one-directional groove 11, a turned-back groove 13, and an another-directional groove 14. This not only raises traction (braking performance) and draining performance, but also improves the sound absorption effect because the lateral grooves 7 can disperse the specific frequencies of air column resonance that is produced by the tubular space formed by the circumferential groove 5.

A common groove 15 is provided to form a root section which has an opening 18 opening to the circumferential groove 5, and a one-directional groove 11 and an another-directional groove 14 are provided to extend branching away from the leading end of the common groove 15. That is, the one-directional groove 11 and the another-directional groove 14 branch away from each other at a position close to the opening 18, so that the one-directional groove 11 of longer extended length absorbs sounds of specific frequencies while the another-directional groove 14 of shorter extended length improves the sound absorption by the one-directional groove 11 using its groove volume.

The one-directional groove 11 is so formed as to extend in one direction from the circumferential groove 5 toward the one side edge 10x of the tire 1 and in one circumferential direction a, and the turned-back groove 13 is so formed as to extend in one direction from the leading end 12 of the one-directional groove 11 toward the other side edge 10y of the tire 1 and in the other circumferential direction b. Thus, when a plurality of lateral grooves 7 are provided in the circumferential direction, the respective end portions of circumferentially adjacent lateral grooves 7 can be positioned on a plane B that intersects the equatorial plane A of the tire 1 at right angles. As a result, a larger number of lateral grooves 7 can be provided circumferentially in the tire tread 2, and the larger number of lateral grooves improves the sound absorption effect thereof.

The angle α3 formed between the one-directional groove 11 and the turned-back groove 13 is 20 degrees or more and 45 degrees or less, and most preferably about 25 degrees. This allows the provision of a larger number of lateral grooves 7 circumferentially in the tire tread 2, which further improves the sound absorption effect.

The acute angle α1 of the one-directional groove 11 of longer extended length with respect to the groove wall 10a is formed as an acute angle that is smaller than the acute angle α2 of the another-directional groove 14 of shorter extended length with respect to the groove wall 10a. Therefore, the one-directional groove 11 has a stronger tendency to extend in a circumferential direction, thereby improving the sound absorption effect of the tire 1, whereas the another-directional groove 14 has a stronger tendency to extend toward the one side edge 10x, thereby improving the edge effect of the tire 1.

The another-directional groove 14 and the turned-back groove 13 are formed substantially in parallel with each other, so that an equal edge effect can be achieved whether the tire 1 is rotated in one circumferential direction or in the other.

The respective end portions of circumferentially adjacent lateral grooves 7 are positioned on a plane B intersecting the equatorial plane A of the tire 1 at right angles. This allows a larger number of lateral grooves 7 to be provided circumferentially in the tire tread 2, which improves the sound absorption effect.

The respective end portions of circumferentially adjacent lateral grooves 7 of the tire 1 are positioned within the lateral groove coexisting region E. This arrangement not only allows provision of a larger number of lateral grooves 7 circumferentially in the tire tread 2, thereby improving the sound absorption effect thereof, but also raises the vibration restricting effect because there will be reduced difference in rigidity in the lateral groove coexisting region E.

The tire 1 with the lateral grooves 4 formed thereon is mounted on a vehicle with the one side edge 10x thereof positioned to face a lateral vehicle side, so that the tire 1 displays excellent steering stability and quieter running.

Second Embodiment

Best Mode 2

Figure 2:
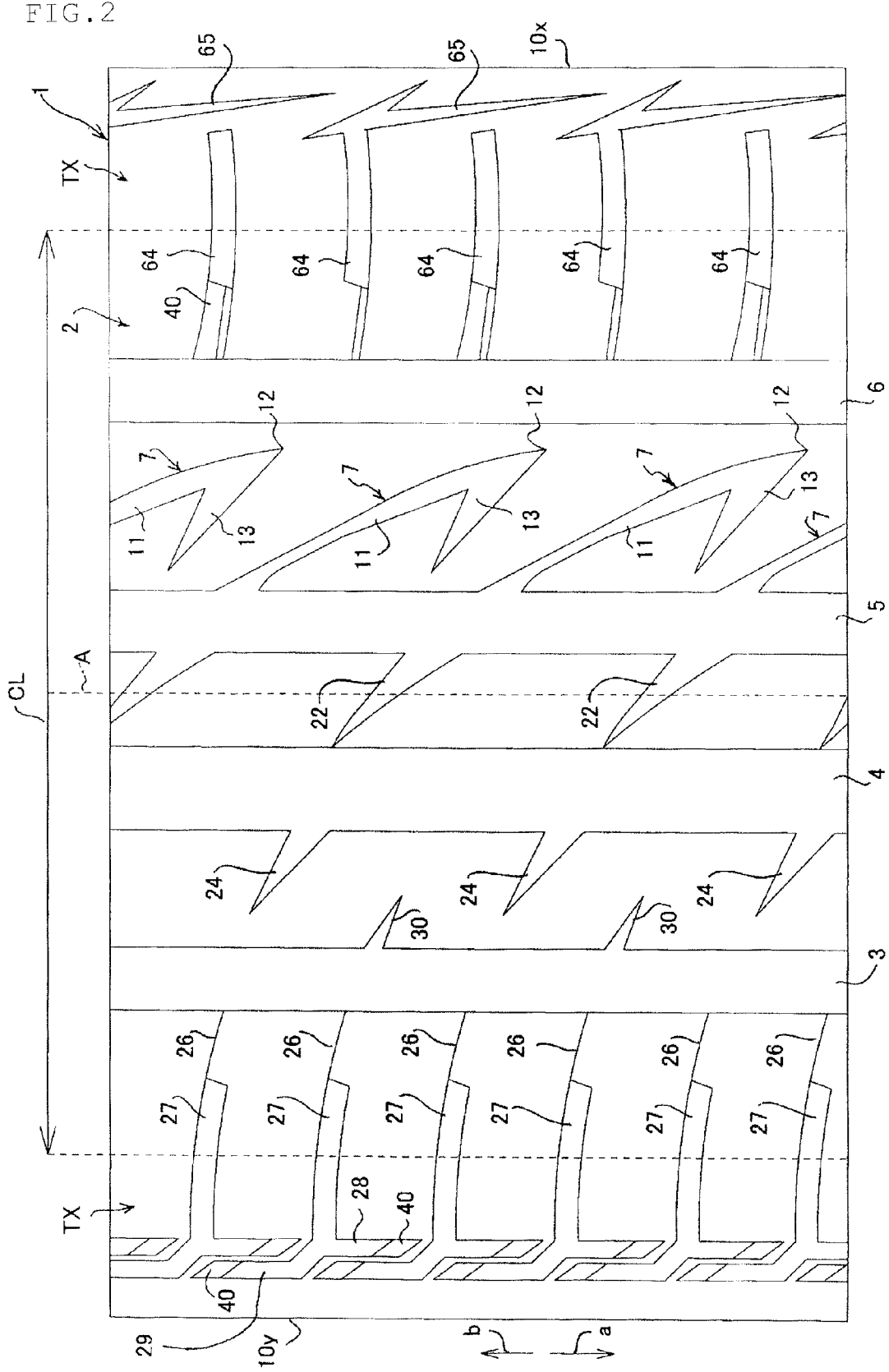
FIG. 2 is an illustration of a groove configuration on the tire tread (second embodiment).

As shown in FIG. 2, a pneumatic tire 1 may comprise a tire tread 2 having the lateral grooves 4, each of which is formed by a one-directional groove 11 and a turned-back groove 13, and the other grooves configured the same way as in the first embodiment.

According to the second embodiment, a lateral groove 4 is formed by a one-directional groove 11 and a turned-back groove 13. Therefore, there is enough total length of the groove to provide a sound absorption effect, thus improving the sound absorption effect by the lateral grooves 7. In the second embodiment, if the extended length of the one-directional groove 11 is 9 cm and that of the turned-back groove 13 is 4 cm, the total length of the groove to provide the sound absorption effect can be made longer. This accomplishes an effect of absorbing sounds of lower frequencies than with the one-directional groove 11 alone.

Third Embodiment

Best Mode 3

Figure 3:
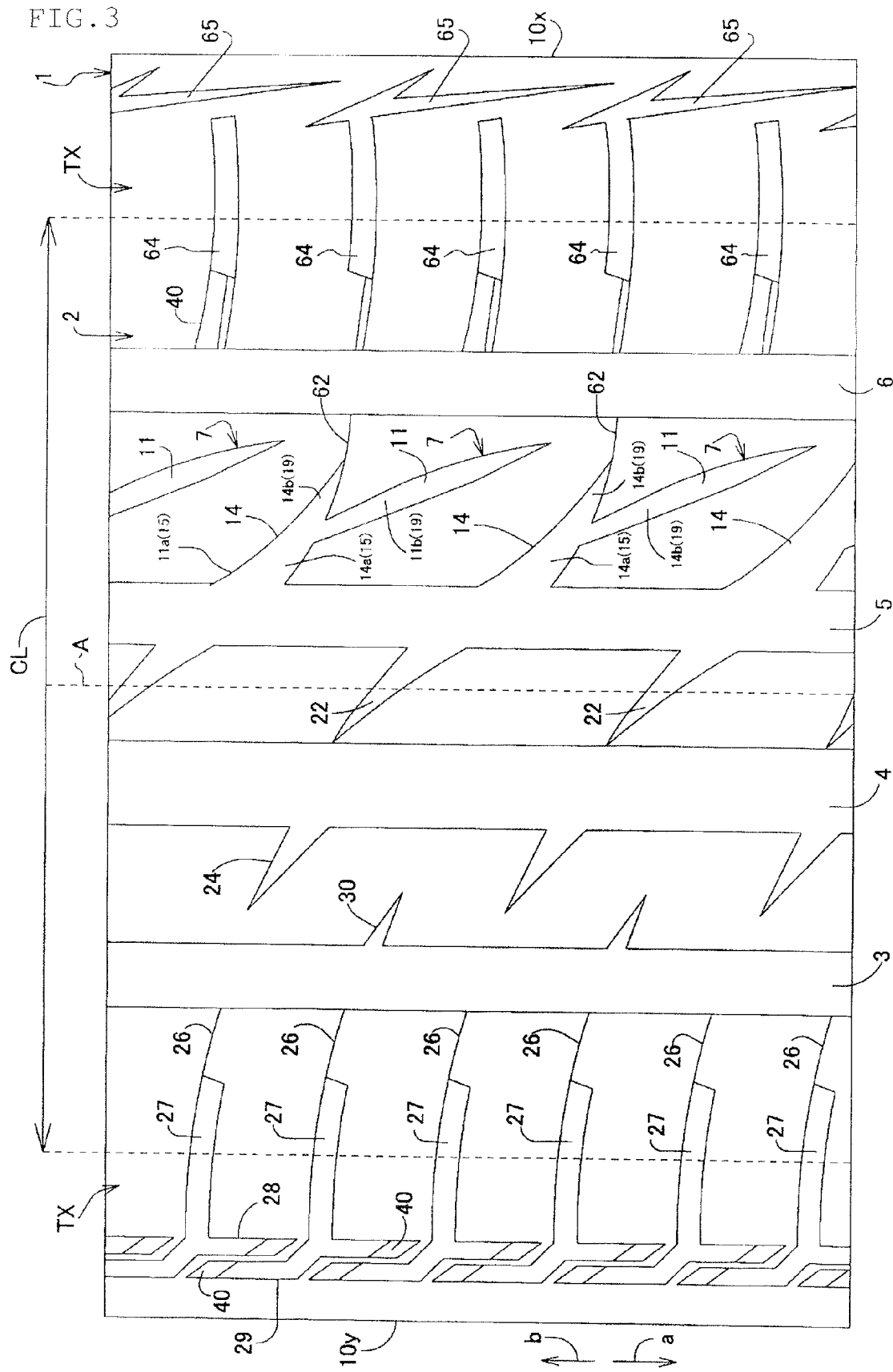
FIG. 3 is an illustration of a groove configuration on the tire tread (third embodiment).

As shown in FIG. 3, a pneumatic tire 1 may comprise a tire tread 2 having the lateral grooves 4, each of which is formed by a one-directional groove 11 and an another-directional groove 14, and the other grooves configured the same way as in the first embodiment.

According to the third embodiment, a lateral groove 4 is formed by a one-directional groove 11 and an another-directional groove 14. Therefore, the one-directional groove 11, with a longer groove length, produces an effect of absorbing sounds of specific frequencies while the another-directional groove 14, with its groove volume, augments the total groove volume of the lateral groove 7, thus improving the sound absorption effect of the lateral groove 7. In the third embodiment, if the extended length of the one-directional groove 11 is 9 cm and that of the another-directional groove 14 is 4 cm, the total groove volume will be greater than with the one-directional groove 11 alone, thus enhancing the sound absorption effect of the lateral groove 7.

Fourth Embodiment

Best Mode 4

Figure 4:
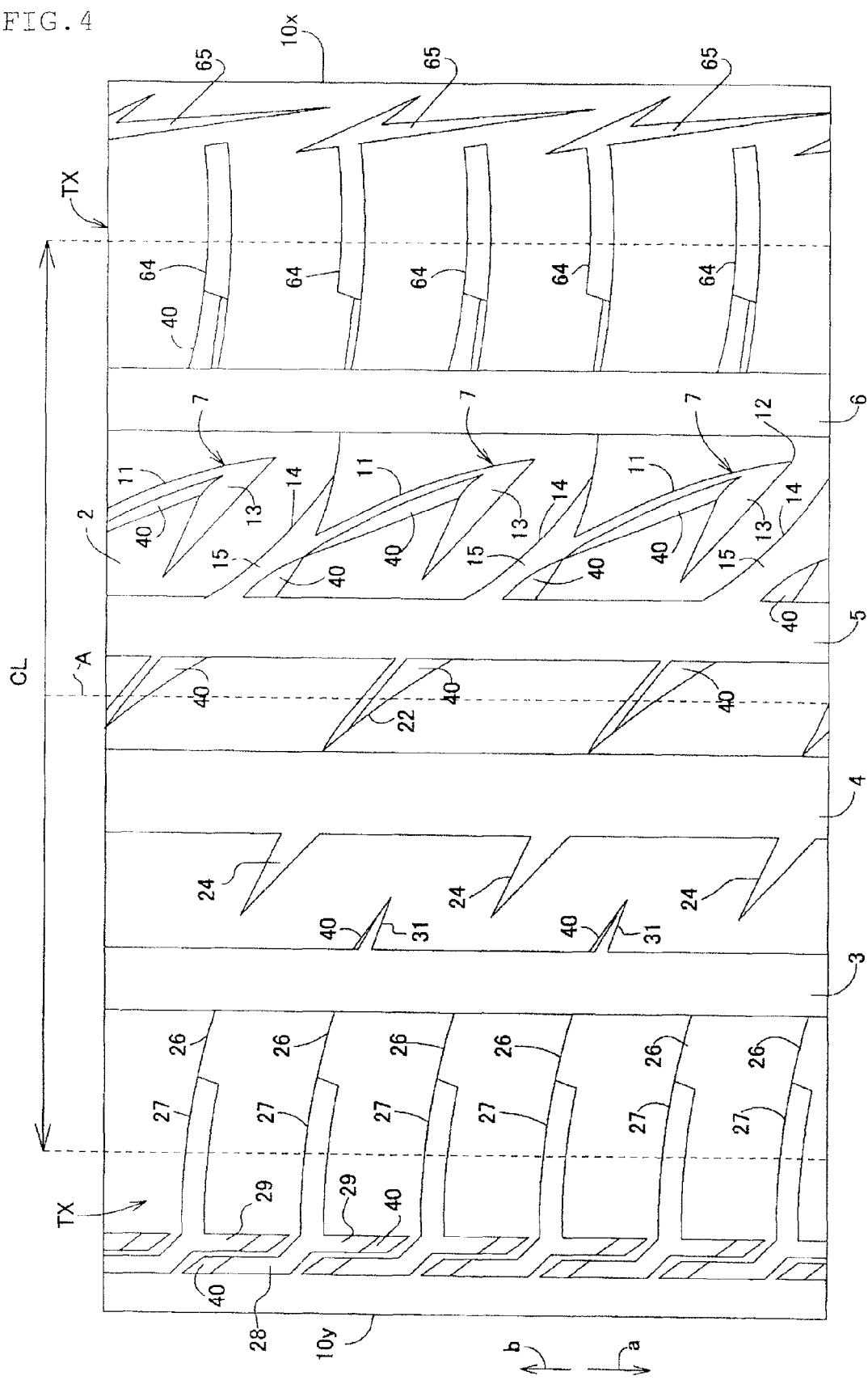
FIG. 4 is an illustration of a groove configuration on the tire tread (fourth embodiment).
Figure 6:
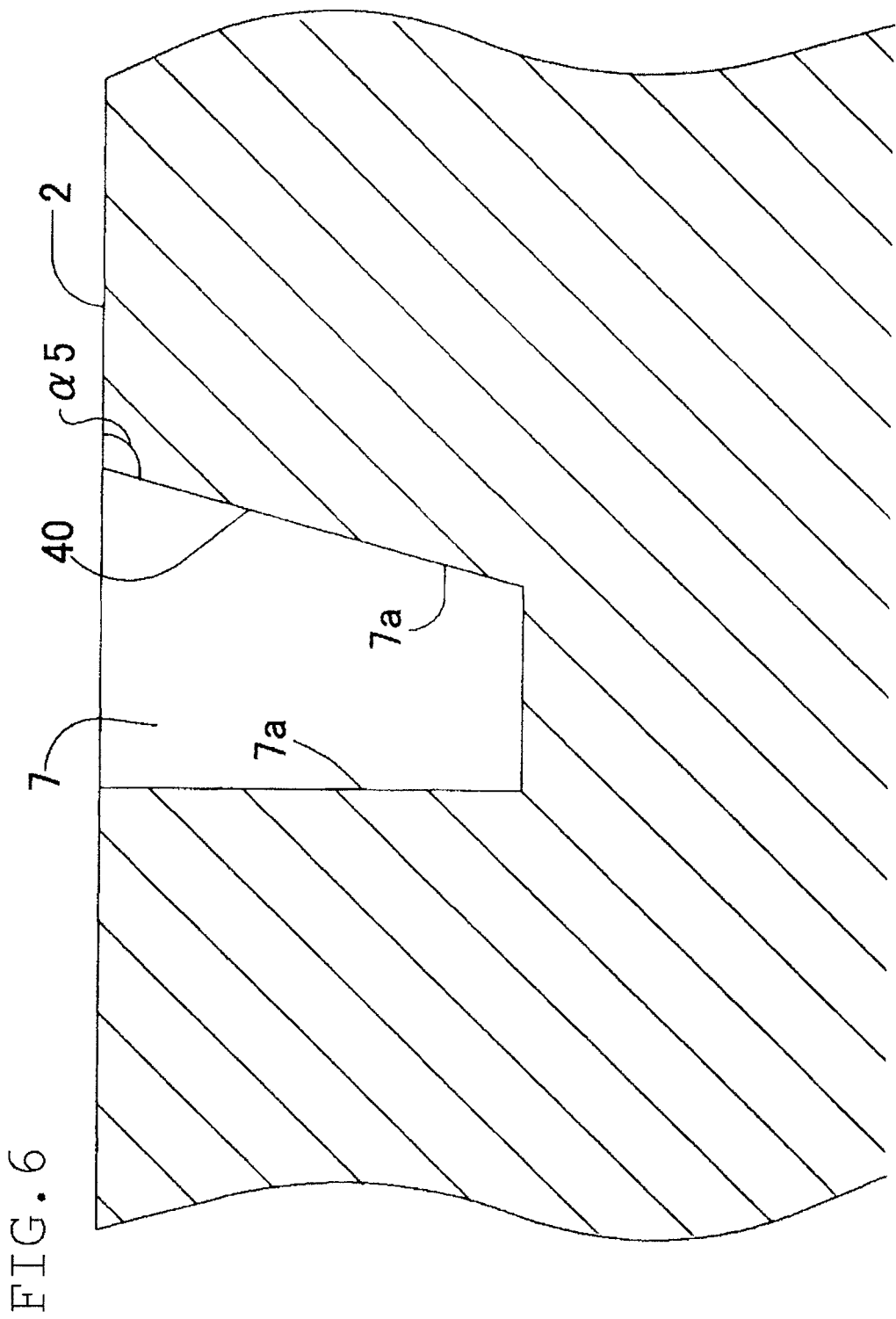
FIG. 6 is a cross section showing an inclined surface forming a groove wall of a lateral groove (fourth embodiment).

As shown in FIGS. 4 and 6, a pneumatic tire 1 may comprise a tire tread 2 having the lateral grooves 4, of which at least a part of the groove walls 7a defining the lateral groove 7 is formed as an inclined surface 40 whose angle with the tire tread 2 is an obtuse angle α5, and the other grooves configured the same way as in the first embodiment.

According to the fourth embodiment, at least a part of the groove walls 7a defining the lateral groove 7 is formed as an inclined surface 40, so that, in addition to the advantageous effects of claim 1, there will be reduced chances of stone retention in the lateral grooves 7. Even when a stone is retained in a lateral groove 7, the inclined surface 40 makes it easier for the stone to extricate itself from the lateral groove 7.

This enhances the effect of preventing stones from getting stuck and achieves the noise restricting effect accordingly.

Results of Verification

Figure 7:
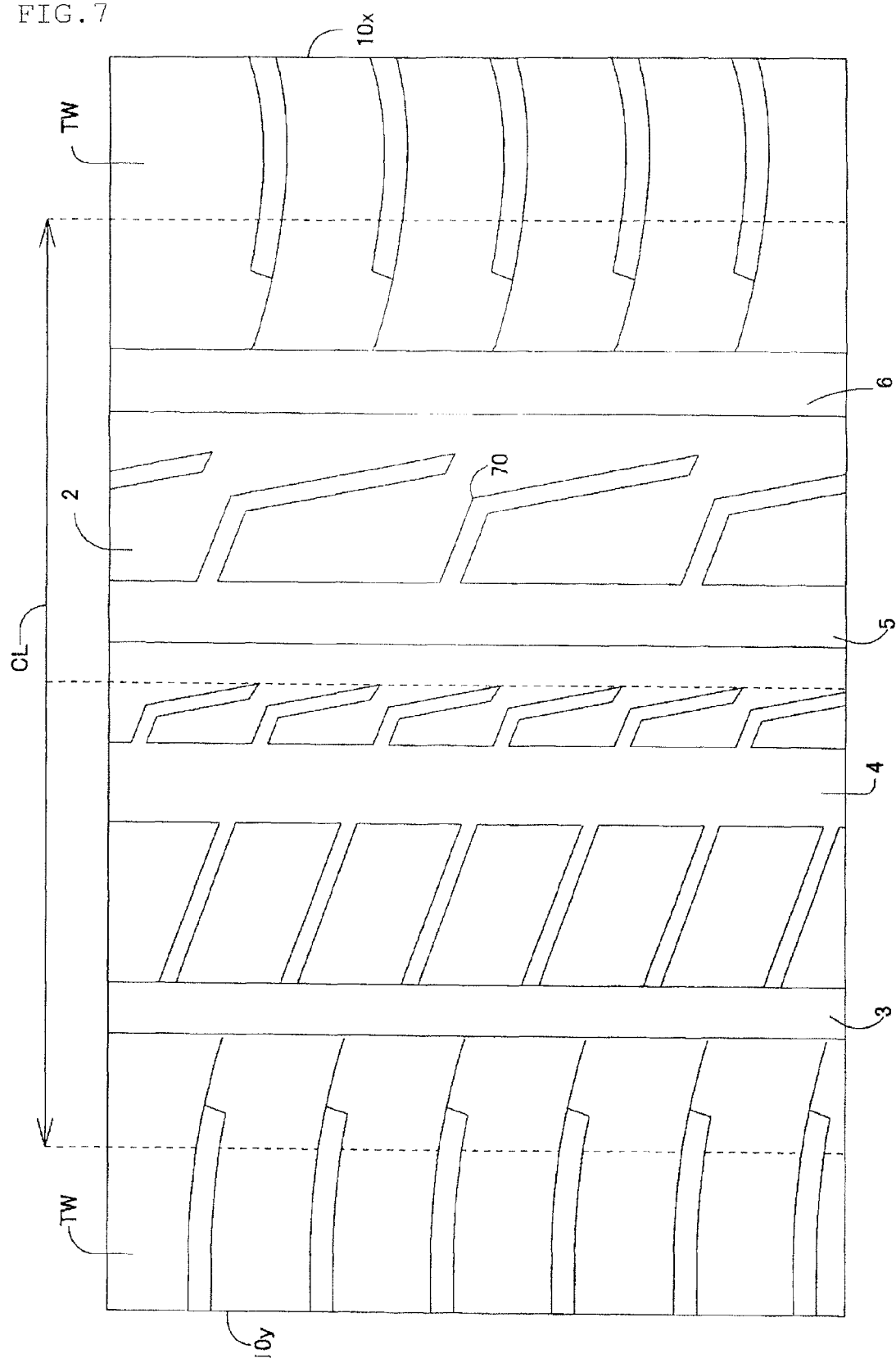
FIG. 7 is an illustration of a groove configuration on the tire tread (comparative example).

A comparison for verification of tire performance was made between the tire of the fourth embodiment shown in FIG. 4 and the comparative example of tire shown in FIG. 7. The tire tread width CL of the tire of the fourth embodiment and the comparative example was 166 mm, and the data on the tire grooves were as shown in FIG. 8. In FIG. 8, the width of the lateral grooves is given in an average value, and the groove angle is an angle with the assumed vertical groove wall. FIG. 9 shows the results of comparative evaluation of the tire of the fourth embodiment and the tire of the comparative example. Shown in FIG. 9 are the evaluations of the tire of the fourth embodiment relative to the evaluation of 100 for the tire of the comparative example. As is evident in FIG. 9, the tire of the fourth embodiment is superior to the tire of the comparative example in any of dry steering stability, noise control effect, and the effect of preventing stones from being retained in the blocks.

INDUSTRIAL APPLICABILITY

Although the above description has covered a case of the lateral grooves 7 provided to extend from the circumferential groove 5 only, the lateral grooves 7 can be provided in such a manner as to extend from each of a plurality of circumferential grooves.

The invention claimed is:

1. A pneumatic tire comprising a tire tread, the tread having circumferential grooves formed continuously in the circumferential direction thereof and lateral grooves extending from a circumferential groove such that one end of each lateral groove is connected to the circumferential groove, wherein each of the lateral grooves includes a one-directional groove extending in one direction from the circumferential groove toward a side edge of the tire, a turned-back groove extending from a point at which a leading end of the one-directional groove terminates, the turned-back groove extending toward the circumferential groove and having a dead end, and an another-directional groove extending in another direction from the circumferential groove toward the side edge of the tire, wherein a root section, which is close to the circumferential groove, of the one-directional groove and a root section, which is close to the circumferential groove, of the another-directional groove are formed by a common groove, wherein a leading part of the one-directional groove and a leading part of the another-directional groove are branching away from each other from a leading end of the common groove, wherein the plurality of lateral grooves are independently arranged side by side, wherein the lateral groove has two ends, only one end of each lateral groove opens to the circumferential groove and another end of each lateral groove is the dead end, and each lateral groove is arranged along with the circumferential direction.

2. The pneumatic tire according to claim 1, wherein the one-directional groove is so formed as to extend in one direction from the circumferential groove toward the one side edge of the tire and in one circumferential direction, and a turned-back groove is so formed as to extend from the leading end of the one-directional groove toward the other side edge of the tire and in the other circumferential direction of the tire.

3. The pneumatic tire according to claim 2, wherein the angle formed between the turned-back groove and the one-directional groove is 20 degrees or more and 45 degrees or less.

4. The pneumatic tire according to claim 1, wherein the another-directional groove and the turned-back groove are formed in parallel with each other.

5. The pneumatic tire according to claim 1, wherein the extended length of each of the lateral grooves is 1.0 cm or more and 20 cm or less.

6. The pneumatic tire according to claim 1, wherein the one-directional groove and the another-directional groove are formed such that their extended lengths differ from each other.

7. The pneumatic tire according to claim 6, wherein the one-directional groove and the another-directional groove are both formed such that they extend in the one circumferential direction of the tire tread and wherein the acute angle of the groove of longer extended length with respect to the circumferential groove is smaller than that of the groove of shorter extended length.

8. The pneumatic tire according to claim 1, wherein the plurality of lateral grooves are arranged side by side in the circumferential direction of the tire tread and wherein the common groove of a first lateral groove and the leading end of the one-directional groove of a second lateral groove that is adjacent to the first lateral groove in the circumferential direction are positioned on a plane intersecting the equatorial plane of the tire at right angles.

9. The pneumatic tire according to claim 1, wherein at least a part of the groove walls of the lateral groove is formed as an inclined surface whose angle with the tire tread is an obtuse angle.

10. The pneumatic tire according to claim 1, wherein the lateral grooves are formed in a position dislocated toward a side edge of the tire from a position on the equatorial plane of the tire and wherein the side on which the lateral grooves are formed is disposed in a position closer to a lateral side of a vehicle.

* * * * *